Oct. 1, 1940.  S. GRANTZ ET AL  2,216,491

INTERNAL COMBUSTION ENGINE

Original Filed July 20, 1938

Inventors
Siegfried Grantz
Werner Lindner
by Maréchal + Noz
attys.

Patented Oct. 1, 1940

2,216,491

UNITED STATES PATENT OFFICE 2,216,491

INTERNAL COMBUSTION ENGINE

Siegfried Grantz and Werner Lindner, Augsburg, Germany, assignors to Maschinenfabrik Augsburg-Nürnberg A. G., Augsburg, Germany, a corporation of Germany Application July 20, 1938, Serial No. 220,256. Renewed March 28, 1940. In Germany August 12, 1937

3 Claims. (Cl. 123—52)

This invention relates to internal combustion engines.

One object of the invention is the provision of an internal combustion engine having an exhaust chamber in communication with the several engine cylinders and mounted closely adjacent and around the combustion spaces and the cylinder walls and in direct communication with the combustion spaces, the combustion chamber being of such size and arrangement as to prevent substantial reduction in the speed of operation or substantial increase in the rate of fuel consumption.

Another object of the invention is the provision of an internal combustion engine having a series of engine cylinders and having a common exhaust chamber of substantial capacity arranged so as to entirely surround all of the engine cylinders and in direct communication with the combustion spaces of the cylinders.

Figure 1:
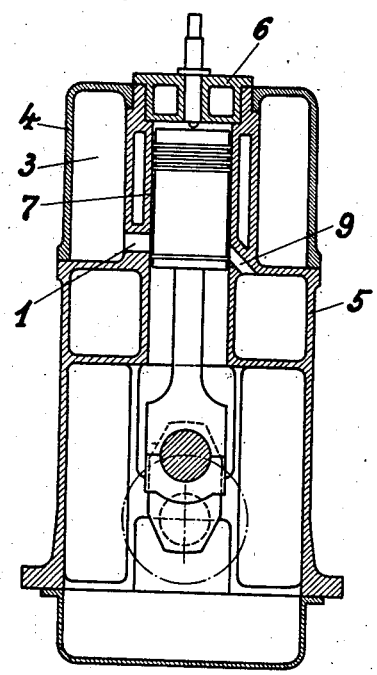
Figure 2:
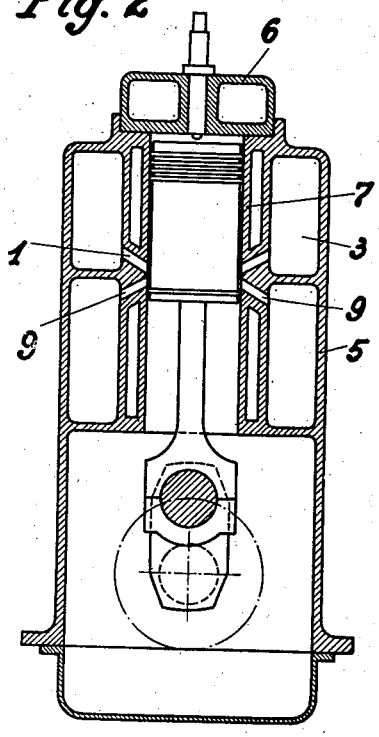
Figure 3:
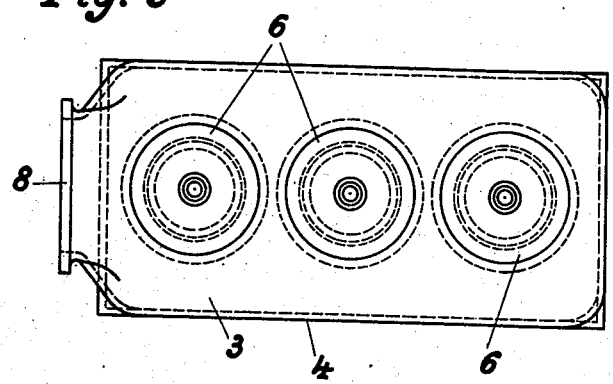

Other objects and advantages will be apparent from the following description, the appended claims, and the accompanying drawing, in which, Fig. 1 is a vertical sectional view of an internal combustion engine embodying the present invention;

Fig. 2 is a vertical sectional view of an engine, showing a somewhat modified frame arrangement; and Fig. 3 is a top plan view of a multi-cylinder engine showing the relationship of the exhaust chamber with respect to the engine cylinders.

Referring more particularly to the drawing by reference numerals, 5 designates the cylinder supporting portion of the frame of an internal combustion engine, herein shown as a multi-cylinder engine adapted for fuel injection and arranged to exhaust the burned gases through exhaust channels 1 in the side walls of the engine cylinders. These exhaust channels 1 are made very short in length and lead the exhaust gases into the exhaust collecting chamber 3 which is defined in part by a wall 4 and in part by the outer surface of the cylinder walls, which are preferably water-cooled.

The wall portion 4 of the exhaust chamber as shown in Fig. 1 is a separate part, seated upon the frame 5, so that the upper part of the cylinder supporting portion of the frame defines the bottom of the exhaust chamber 3.

The common exhaust chamber with which all of the combustion spaces of the cylinders communicate is of large capacity, the height of the chamber being preferably of the order of the height of the combustion chamber, it being apparent from Figs. 1 and 2 that the exhaust chamber 3 extends up substantially to the cylinder head. The chamber 3 extends around or envelops the cylinder walls of all the cylinders, the outer annular surfaces of the cylinder walls being entirely surrounded by the exhaust gases. The chamber 3 reaches around the end cylinders of the series and terminates at one end in a joint or flanged portion 8 that is adapted for communication to a common exhaust pipe which leads to a suitable exhaust receptacle.

The scavenging and charging air supply to the engine may come from an air supply chamber arranged below the exhaust chamber 3 through inclined air supply passages 9 as shown in Figs. 1 and 2.

In accordance with the construction illustrated in Fig. 2, the exhaust chamber 3 is formed as an integral part of the engine frame, the frame being extended upwardly to surround the cylinder walls up to the cylinder heads 6. The arrangement of the exhaust chamber around the end cylinders is the same as in the construction shown in Fig. 3.

Since the exhaust receiving chamber 3 is in direct communication with the several engine cylinders and is of unusually large size and capacity, the combustion engine is practically independent of the size of the exhaust receptacle to which the exhaust gases are supplied after leaving the exhaust chamber 3, and the speed of operation of the engine is not adversely affected while the fuel consumption is maintained at an efficient value. Since the exhaust chamber 3 envelops the cylinder walls this space is utilized without increasing the height or width of the engine, leaving the space along the sides of the engine below the cylinder walls available to accommodate such apparatus as the blower, fuel pump and other auxiliary devices. The exhaust chamber 3 moreover forms a nicely finished smooth upward continuation of the sides of the engine and also has a more effective muffling action on the sound than is obtained in conventional exhaust pipes which conduct the exhaust in the conventional manner from the engine cylinders to the common muffler. The invention is especially adaptable for engines of the medium and smaller sizes, which are affected to greater extent than the large size engines by the size of the exhaust passages which extend from the engine cylinders. It has been found that a decrease of about 25% in the size of the exhaust receptacle to which the exhausts are conducted after leaving the exhaust chamber 3 has had no substantial effect on the fuel consumption of the engine or on the power output of the engine.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an internal combustion engine, a series of engine cylinders having cylinder walls and pistons operable therein, means supporting said cylinder walls, an exhaust chamber for receiving the exhaust gases directly from said engine cylinders and extending along the sides of said cylinder walls and enveloping portions thereof, said chamber extending in a zone laterally adjacent the combustion spaces of the cylinders throughout substantially the entire height of the combustion spaces.

2. In an internal combustion engine, a series of engine cylinders having cylinder walls and pistons operable therein, means supporting said cylinder walls, an exhaust chamber for receiving the exhaust gases directly from said engine cylinders and extending around and enveloping the sides of said cylinder walls and reaching from exhaust passages in the cylinder walls to the cylinder heads, said cylinder walls having exhaust passages remote from the cylinder heads placing said exhaust chamber in direct communication with the combustion chambers of the cylinders.

3. In an internal combustion engine, a series of engine cylinders having cylinder walls and pistons operable therein, a frame supporting said cylinder walls and including side frame portions extending substantially parallel to the cylinder axes, and an exhaust chamber for receiving the exhaust gases directly from said engine cylinders and extending along opposite sides of said cylinder walls and around portions of said cylinders, said exhaust chamber being arranged at the upper portion of said frame and having outer walls forming substantially flush continuations of said side frame portions.

SIEGFRIED GRANTZ.
WERNER LINDNER.